US009600023B2

(12) United States Patent
Boerger et al.

(10) Patent No.: US 9,600,023 B2
(45) Date of Patent: Mar. 21, 2017

(54) METHOD AND DATA PROCESSING UNIT FOR PROVIDING A TIMESTAMP

(71) Applicant: dSPACE digital signal processing and control engineering GmbH, Paderborn (DE)

(72) Inventors: Ralf Grosse Boerger, Paderborn (DE); Marco Schmidt, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 592 days.

(21) Appl. No.: 13/852,595

(22) Filed: Mar. 28, 2013

(65) Prior Publication Data

US 2013/0262911 A1    Oct. 3, 2013

(30) Foreign Application Priority Data

Mar. 29, 2012 (EP) .................................... 12162111

(51) Int. Cl.
*G06F 1/14* (2006.01)
*G06F 1/12* (2006.01)
*G06F 9/48* (2006.01)

(52) U.S. Cl.
CPC ................. *G06F 1/14* (2013.01); *G06F 1/12* (2013.01); *G06F 9/4887* (2013.01)

(58) Field of Classification Search
CPC . G06F 9/4825; G06F 1/14; G06F 1/12; G06F 2201/835; G06F 1/04; G06F 11/0757; G06F 11/3419; G06F 1/06; G06F 1/10
See application file for complete search history.

(56) References Cited

U.S. PATENT DOCUMENTS 5,059,926 A * 10/1991 Karczewski .................... 331/47
6,370,161 B1 * 4/2002 Ehrlich et al. ................ 370/516
(Continued)

FOREIGN PATENT DOCUMENTS

JP    2009-512392 A    3/2009

OTHER PUBLICATIONS

Lui Sha et al.; "Real-Time Scheduling Theory and Ada", Apr. 30, 1989, pp. 1-32, found on the internet: URL:http://www.dtic.mil/dtic/tr/fulltext/u2/a211397.pdf.
(Continued)

*Primary Examiner* — Zahid Choudhury
(74) *Attorney, Agent, or Firm* — Muncy, Geissler, Olds & Lowe, P.C.

(57) ABSTRACT

A method for providing a timestamp in a real-time system, whereby the real-time system has an FPGA and a CPU, which cooperate with one another, and at least one register, which contains a system time, is implemented in the FPGA. The method includes the steps of providing a CPU counter for the system time, which is driven by a clock signal of the CPU, providing a synchronization counter in the CPU, whereby the synchronization counter is driven by a clock signal of the CPU, reading of the counter for providing the system time by a real-time application, querying the synchronization counter in the real-time application, and synchronizing the counter with the system time in the real-time application, when the synchronization counter outputs a value that corresponds to more than a predefined time period since the last synchronization of the CPU counter with the system time.

16 Claims, 4 Drawing Sheets

(56) References Cited

U.S. PATENT DOCUMENTS

2004/0117682 A1* 6/2004 Xu .............................. 713/400
2004/0146071 A1* 7/2004 Lee et al. ..................... 370/503
2006/0047989 A1   3/2006 Delgado et al.
2007/0087734 A1   4/2007 Hinterberger et al.

OTHER PUBLICATIONS

Machine Translation of extended European Search Report.
European Office Action for European Application No. 12162111.4 dated Sep. 11, 2015 with English translation.
CompactRIO Developers Guide: Recommended LabView Architecture and Development Practices for Machine Control Applications: Section Three: Customizing Hardware Through LabVIEW FPGA, pp. 1, I and 136-180 (Dec. 1, 2009) found at http://www.ni.com/pdf/products/us/criodevgudsec3.pdf.
Japanese Office Action for Japanese Application No. 2013-071366 dated Dec. 20, 2016 with English translation.

* cited by examiner

METHOD AND DATA PROCESSING UNIT FOR PROVIDING A TIMESTAMP

This nonprovisional application claims priority under 35 U.S.C. §119(a) to European Patent Application No. EP 12162111.4, which was filed on Mar. 29, 2012, and which is herein incorporated by reference.

BACKGROUND OF THE INVENTION

Field of the Invention

The present invention relates to a method for providing a timestamp in a real-time system, whereby the real-time system comprises an FPGA and a CPU, which cooperate with one another, and at least one register, which contains a system time, is implemented in the FPGA. Further, the invention relates to a data processing unit as a real-time system having an FPGA and a CPU, which cooperate with one another, whereby at least one register, which contains a system time, is implemented in the FPGA and the real-time system is designed to carry out the above method. The invention also relates to a computer program product with computer-implemented instructions, said product which after loading and execution in a suitable data processing unit performs the steps of the above method, and a digital storage medium with electronically readable control signals, which can work together with a programmable computer system so that the above method is carried out in the computer system.

Description of the Background Art

In different fields of application for data processing units, the use of an absolute time base is necessary to be able to perform a synchronization of various processes. In distributed systems, different methods for synchronization are known, for example, the Berkeley algorithm, the Cristian algorithm, or the Network Time Protocol (NTP). These algorithms consider only the distribution of the time among different data processing units.

In data processing units, particularly in real-time systems, more and more applications are used today that also require a reliable time base internally. For example, it may be necessary during the logging of events to determine absolute time intervals between the individual events in order to be able to process these further. Furthermore, data processing units are used increasingly today that comprise a plurality of processors for processing different tasks. In this case, a common time base for the different CPUs may be necessary.

Thus, a plurality of processors on a plurality of boards is frequently used in test systems for control electronics. Processors require a common time base for synchronizing software. This is provided on the boards typically not by the processors themselves but by external components such as, for example, FPGAs. If a software requires a timestamp, the corresponding processor asks for the current time from the FPGA. This query requires a certain amount of time. The timestamps are necessary, e.g., for presenting individual values in a plotter or for the time-based presentation of real-time tasks in a profiler.

Accordingly, a timestamp in the case of a DS1006 processor board from the company dSPACE is obtained through accesses to the register of the dSPACE FPGA. Timestamps are taken relatively frequently in the simulation and execution of real-time models. Accesses to the FPGA are relatively costly, however, in comparison with accesses to local CPU variables, as a result of which the calculation of timestamps is time-consuming and the turnaround times for individual tasks increase.

Many processors have an internal clock. Querying this clock to ask for the current time requires much less time than querying the external component, i.e., the FPGA. However, the internal clock has a low accuracy and can depend on the processor clock, for which reason the internal clock is not suitable as reference for many applications. In addition, the internal clocks of different processors are not coupled together, so that they can diverge. In real-time applications, synchronization of the processor internal clock with the global time per interrupt is not possible. To assure a deadline-conforming processing of real-time tasks, CPU interrupts cannot be used and therefore are often blocked during the processing of real-time tasks. Thus, the internal clock cannot be used for generating timestamps. An internal clock of a processor is also independent of a system time implemented in the FPGA, because it uses its own quartzes for clock generation. Accordingly, the internal clocks of different processors are not synchronous.

SUMMARY OF THE INVENTION

It is therefore an object of the invention to provide a method of the aforementioned type that enables effective provision of a precise timestamp and accelerates execution of real-time applications.

According to an embodiment of the invention, a method is provided for providing a timestamp in a real-time system, whereby the real-time system comprises an FPGA and a CPU cooperating with one another, and at least one register containing a system time, is implemented in the FPGA, said method comprising the steps of providing a CPU counter for the system time, said counter which is driven by a CPU clock signal, providing a synchronization counter in the CPU, whereby the synchronization counter is driven by a CPU clock signal, reading of the CPU counter to provide the system time by a real-time application, querying of the synchronization counter in the real-time application, and synchronizing the CPU counter with the system time in the real-time application, when the synchronization counter outputs a value that corresponds to more than a predefined time period since the last synchronization of the CPU counter with the system time.

According to an embodiment of the invention, a data processing unit is provided as a real-time system having an FPGA and a CPU, which cooperate with one another, whereby at least one register, which contains a system time, is implemented in the FPGA and the real-time system is designed to carry out the above method.

According to an embodiment of the invention, a computer program product with computer-implemented instructions is also provided, the product which after loading and execution in a suitable data processing unit performs the steps of the above method.

Finally, according to an embodiment of the invention a digital storage medium is provided having electronically readable control signals and which can work together with a programmable computer system so that the above process is executed.

In an embodiment, an idea of the present invention is to assure by means of the synchronization counter that the CPU counter is synchronized regularly with the system time, so that the provision of timestamps can be accelerated by access to the thus synchronized CPU counter. The real-time application can comprise one or more real-time tasks that read the system time. Provided the demand on resources by one or more real-time applications or real-time tasks with a high priority prevents the synchronization of the CPU counter, this can be detected by the synchronization counter to prevent the provision of an unsuitable timestamp. Thus, to generate timestamps the CPU counter can be accessed and therefore internal access to the CPU occurs. This access is more rapid than the access to external registers. Interruptions or delays of real-time applications or real-time tasks can be reduced. In general, the execution of real-time applications or real-time tasks in the real-time system is accelerated. The checking of the synchronization counter is preferably performed in such a way that the reaching of a threshold value corresponding to the time period is checked. Accordingly, during synchronization of the CPU counter, the synchronization counter is reset. Alternatively, the synchronization counter can count further continuously, while the threshold value on which the checking is based is adjusted. The threshold value is used to define a maximum time after which the CPU counter must be resynchronized with the FPGA register, so that the CPU counter and FPGA register cannot drift apart too far. Proceeding from the accuracy of the CPU counter, therefore, a maximum deviation of the CPU counter from the FPGA register, based on requirements for system time, can be predetermined, so that a sufficiently accurate time is provided by the CPU counter. Both the CPU counter and the synchronization counter can principally be configured incrementing or decrementing. The synchronization counter can also be configured integral with the CPU counter; i.e., only one counter is used in the CPU. The individual steps of the method can be performed in a different sequence. A precise timestamp is provided in the CPU by the synchronization of the CPU counter with the register.

In an embodiment of the invention, the synchronizing of the CPU counter with the system time comprises storing the CPU counter and the FPGA register value at the time of the synchronization and the providing of the system time by a real-time application comprises the calculating of the system time from the stored CPU counter and the stored FPGA register value, as well as the read CPU counter value. The system time can be calculated each time from the stored values together with a current value of the CPU counter. At the same time, the cost of implementing counters in the CPU is reduced. The synchronization counter can therefore also be made integral with the CPU counter, because the time period since the last synchronization can be determined and compared with a predetermined time period by a comparison of the stored value of the CPU counter at the time of the synchronization with the current value of the CPU counter.

In an embodiment of the invention, the storing of the CPU counter at the time of synchronization comprises reading the CPU counter before the storing of the FPGA register value, reading of the CPU counter after the storing of the FPGA register value, and storing of a time average of the CPU counter before and after the storing of the FPGA register value. As a result, the time period for reading the FPGA register is considered. The stored value of the CPU counter is set precisely to the time of synchronization by the averaging.

In an embodiment of the invention, a value of less than 1 s, preferably less than 100 ms, and especially preferably of about 10 ms is selected for the time period. These values depend, for example, on the requirements for synchronicity and/or accuracy of the timestamp and the accuracy of the CPU clock signal, which drives the CPU counter. The indicated values for the time period can therefore be selected as a function of the real-time system and real-time applications performed therein.

In an embodiment of the invention, the step of reading the CPU counter by the real-time application is performed together with the steps of querying the synchronization counter in the real-time application and of synchronizing the CPU counter with the system time in the real-time application. The synchronization of the CPU counter is therefore checked regularly during the reading of the CPU counter by the real-time application, as a result of which there is a continuous checking of the synchronization in conformity with the frequency of the reading of the CPU counter and accordingly also a continuous synchronization of the CPU counter. Preferably, the synchronization is not limited to the reading of the CPU counter.

In an embodiment of the invention, the steps of querying the synchronization counter in the real-time application and synchronizing the CPU counter with the system time in the real-time application are performed before the reading of the CPU counter by the real-time application. This assures that only a synchronous system time is provided from the CPU counter for the timestamp.

An embodiment of the invention comprises the step of periodic synchronization of the CPU counter with the system time. Providing the timestamp can be simplified by the periodic synchronization, because the reading of the register containing the system time can often be dispensed with in relation to the providing of the timestamp. Preferably, before the CPU counter is read to provide the system time, the synchronization is checked with use of the synchronization counter and a synchronization is carried out upon request as stated above. Preferably, the periodic synchronization of the CPU counter in each case causes a reset of the synchronization counter or adjustment of the threshold value if the synchronization counter does further continuous counting. Alternatively, the synchronization causes the storing of a counter value that corresponds to the synchronization time.

In an embodiment of the invention, the periodic synchronization of the CPU counter with the system time is carried out as part of a periodic real-time application or real-time task. The periodic execution of the real-time application or real-time task assures regular synchronization of the CPU counter with the system time with the means available in the system. A stand-alone application for this purpose need not be provided. It is advantageous further that the delay of the real-time application or real-time task is known and sporadic interruptions of other real-time applications or real-time tasks are prevented. The periodic real-time task is preferably a real-time task of the real-time application that reads the system time.

In an embodiment of the invention, selected as the periodic real-time application or real-time task is the one with the longest period length from all periodic real-time applications or real-time tasks. Therefore, resources for synchronizing the CPU counter with the register containing system time can be reduced.

In an embodiment of the invention, the periodic synchronization of the CPU counter with the system time is carried out with a period of less than 10 ms, preferably less than 5 ms, and especially preferably of about 1 ms. Use of a suitable period assures that the CPU counter is synchronized regularly to be able to provide the timestamp at any time. The value for the period depends, for example, on the requirements for synchronicity and/or accuracy of the timestamp and the accuracy of the CPU clock signal, which drives the CPU counter. The indicated values for the period can therefore be selected differently depending on the real-time system and different real-time applications performed therein.

In an embodiment of the invention, the synchronization of the CPU counter with the system time is carried out as a low-priority application. Therefore, the synchronization of the CPU counter with the system time can be carried out without limiting the processing of high-priority applications. The synchronization counter assures that the synchronization of the CPU counter with the system time can be checked to prevent an unsuitable timestamp. Preferably, the low-priority application is a real-time application or a real-time task.

In an embodiment of the invention, it is provided that the real-time system carries out a planning for the time sequence of real-time applications and/or real-time tasks, and the synchronization of the CPU counter with the system time is carried out in a time window that is not occupied by any real-time application or real-time task. Therefore, only unused resources are used for the synchronization. It is achieved accordingly that real-time applications and real-time tasks can be processed reliably according to their requirements. Preferably, this synchronization of the CPU counter also causes a reset of the synchronization counter or adjustment of the threshold value if the synchronization counter counts further continuously. Alternatively, the synchronization causes the storing of a counter value that corresponds to the synchronization time.

In an embodiment of the invention, the real-time system has a plurality of CPUs, a CPU counter for the system time and a synchronization counter are provided in each CPU, and the synchronization of the CPU counter with the system time is carried out in the real-time application independently for each CPU. Therefore, a common register in the real-time system can be used as a basis for synchronizing various CPU counters of various CPUs. The CPUs can together provide synchronized timestamps with a high efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
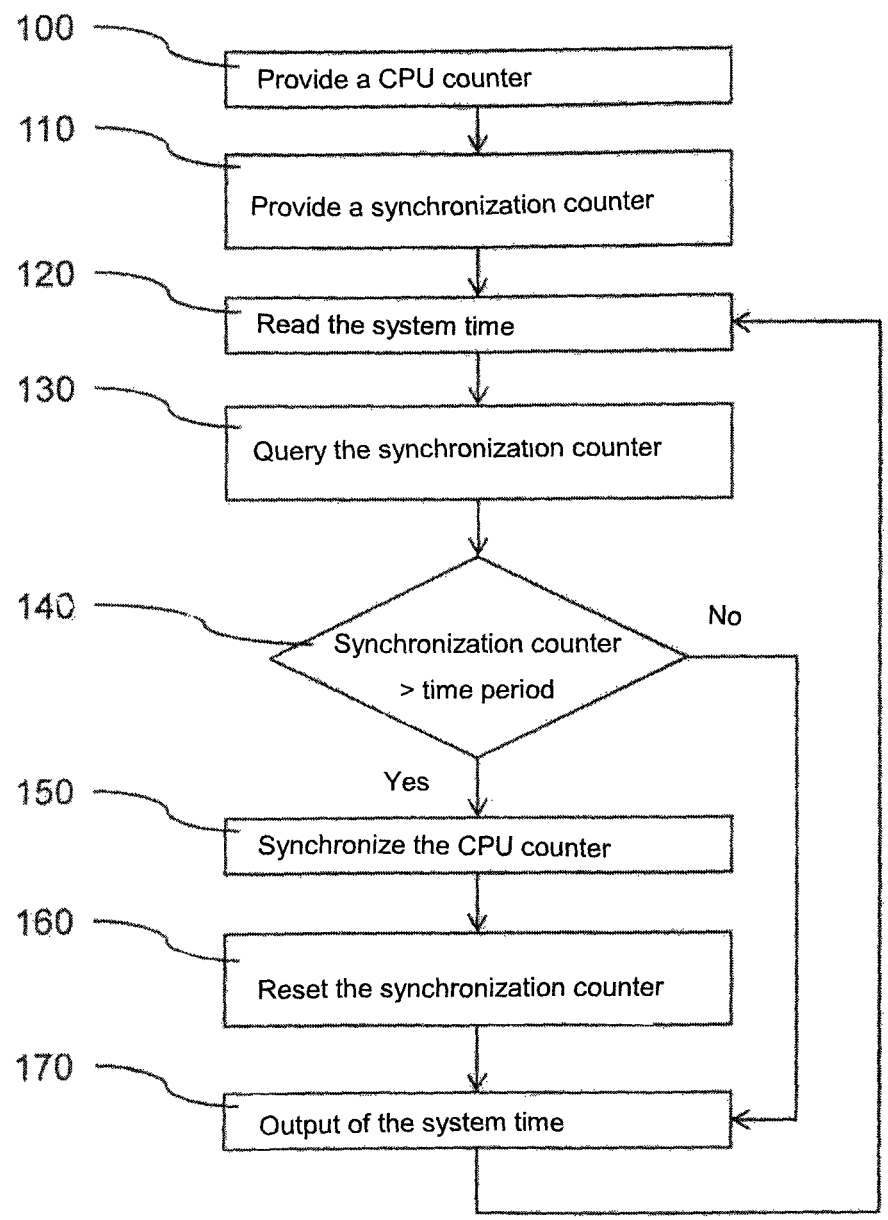
FIG. 1 is a flowchart of a method according to a first embodiment of the present invention for execution by a first real-time application.
Figure 2:
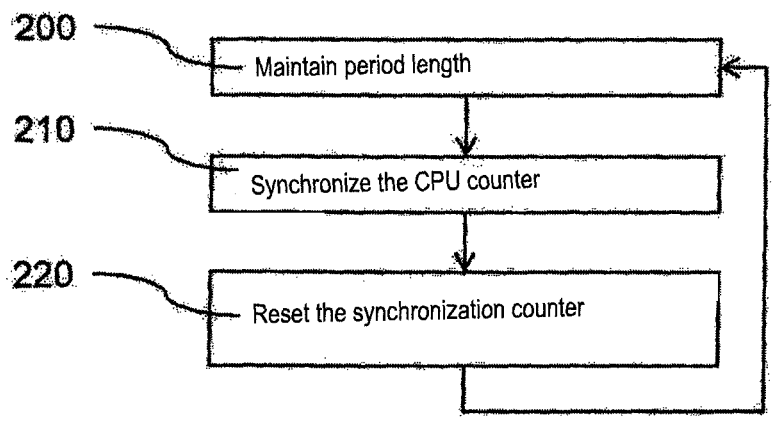
FIG. 2 is a flowchart of a method according to the first embodiment parallel to the method shown in FIG. 1 for execution by a second real-time application.
Figure 3:
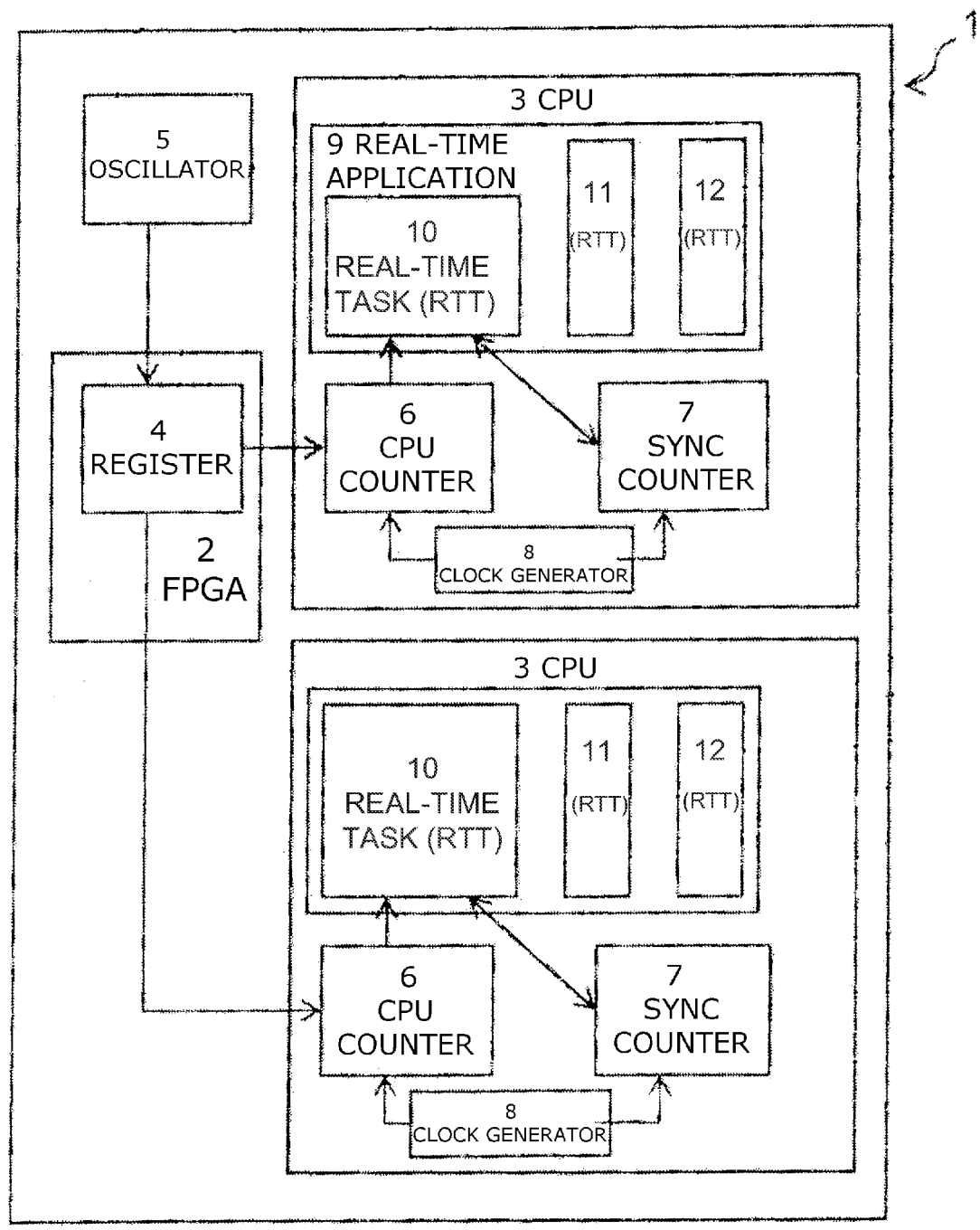
FIG. 3 illustrates a schematic structure of a real-time system for executing the method of the invention.

FIGS. 1 and 2 show the processes of a method of the invention according to a first embodiment which is carried out in a real-time system 1, shown schematically in FIG. 3.

Real-time system 1 comprises an FPGA 2 and two CPUs 3, which have an identical structure, whereby FPGA 2 and CPUs 3 cooperate with one another. A register 4 which contains a system time is implemented in FPGA 2. A precise quartz oscillator 5 supplies clock signals which register 4 increments continuously.

Each CPU 3 comprises a CPU counter 6 and a synchronization counter 7, which is driven incrementally by a clock signal of a clock generator 8.

A real-time application 9 with three real-time tasks 10, 11, 12, which are illustrated here by way of example and have different priorities, is executed in each CPU 3. A first real-time task 10 has a high priority, whereas a second and third real-time task 11, 12 have a low priority. The second and third real-time tasks 11, 12 are executed periodically and differ in that the second real-time task 11 has a longer period length than the third real-time task 12. In principle, the number of real-time tasks 10, 11, 12 is arbitrary.

The method of the invention is carried out independently in the two CPUs 3. It comprises in step 100 the providing of CPU counter 6 as previously described.

In step 110 the method comprises further the providing of synchronization counter 7 as previously described.

The providing of counters 6, 7 comprises in addition an initialization, whereby CPU counter 6 is synchronized with register 4 and synchronization counter 7 is reset to zero.

In step 120, the reading of the system time from CPU counter 6 is started by a real-time task 10, 11, 12 of real-time application 9, which here by way of example is the first high-priority real-time task 10. Further, the method shown in FIG. 1 is described with reference to first high-priority real-time task 10, without this being mentioned explicitly each time.

In step 130, synchronization counter 7 is queried by first real-time task 10, as is also shown schematically in FIG. 3.

In step 140, it is checked whether synchronization counter 7 contains a value that is greater than a predetermined time period, which here is 10 ms in conformity to requirements for the synchronicity and accuracy of the timestamp and the accuracy of the clock signal of CPU 3. As a result, it is checked in step 140 whether CPU counter 6 needs to be synchronized. If the value of synchronization counter 7 is smaller than the predetermined time period, the method is continued in step 170; otherwise the method is continued with step 150.

In step 150, CPU counter 6 is synchronized with register 4. To this end, register 4 is read by first real-time task 10 and the read value is communicated to CPU counter 6.

In addition, in step 160, synchronization counter 7 is reset by first real-time task 10 to indicate the completed synchronization of CPU counter 6.

In step 170, the system time is read. To this end, CPU counter 6 is read by first real-time task 10 and the read value is provided as a timestamp.

The method of the invention comprises furthermore a periodic synchronization of CPU counter 6 with the system time in register 4, as will be explained below with reference to FIG. 2. The periodic synchronization is carried out by the second real-time task 11 with a low priority and longer period length, without this being mentioned explicitly each time. The periodic synchronization shown in FIG. 2 is carried out as part of second real-time task 11.

The periodic synchronization is started in step 200. It is checked in second real-time task 11 whether a predetermined period for the synchronization has been reached. The period in this exemplary embodiment is selected as 1 ms depending on requirements for the synchronicity and accuracy of the timestamp and the accuracy of the clock signal of CPU 3, which drives CPU counter 6. The period in this exemplary embodiment corresponds to twice the period length of second real-time task 11. Accordingly, it is checked in step 200 whether the period was already reached. As soon as the period is reached, the method is continued with step 210.

In step 210, CPU counter 6 is synchronized with the system time in register 4, as was already explained in principle in step 150.

In step 220, synchronization counter 7 is reset, as was already explained in principle in step 160.

The previously described process steps are performed independently by real-time tasks 10, 11, 12 of both CPUs 3. In this regard, common register 4 in real-time system 1 is used as the basis for the synchronization in each case for synchronizing CPU counter 6 with the system time.

Figure 4:
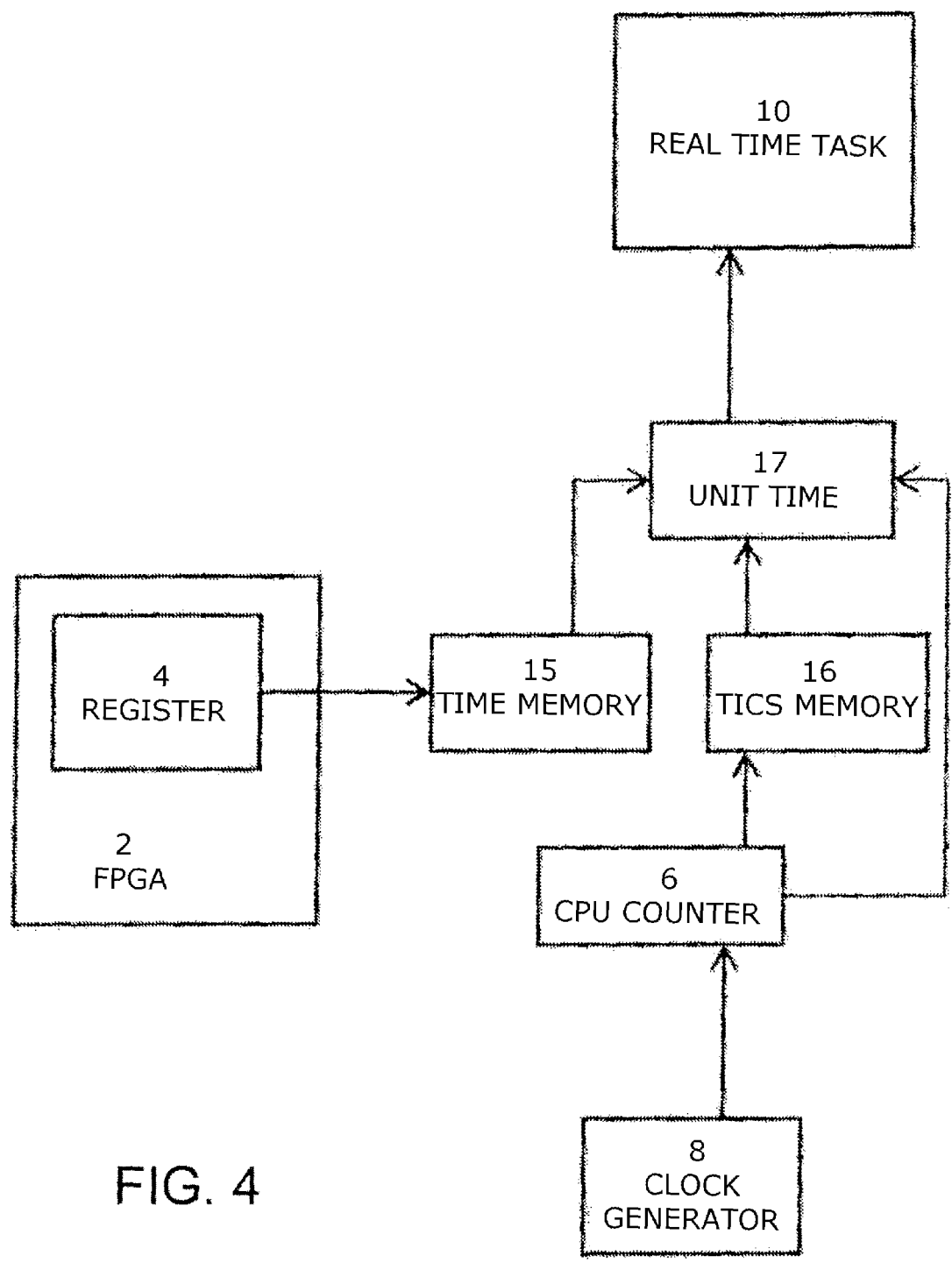
FIG. 4 illustrates a schematic structure for determining the system time in the CPU according to a second embodiment of the present invention.

A second embodiment of the invention will be described hereafter with reference to FIG. 4. Provided the second embodiment corresponds to the previously described embodiment, reference will be made to the latter. The differences of the second embodiment will be explained below.

The second embodiment differs from the first embodiment in the type of synchronization and checking of the predetermined time period since the last synchronization. CPU 3 here comprises as a counter only a CPU counter 6, which is used both for calculating the system time and for checking the time period since the last synchronization. As previously described, CPU counter 6 is clocked by clock generator 8.

During the synchronization of CPU counter 6 with the system time in step 150 or 210, the value of the FPGA register is stored in a time memory 15. CPU counter 6 is read in each case before and after storing of the value of FPGA register 4 in a time memory 15. A time average of CPU counter 6 is formed from the read values before and after storing of the FPGA register value and stored in a tics memory 16. Accordingly, this step therefore includes the resetting of the synchronization counter in steps 160 or 220.

Different from the first embodiment, the value of tics memory 16 is therefore read in step 130 and compared with the current value of CPU counter 6. In this case, the value of tics memory 16 is subtracted from the current value of CPU counter 6.

Therefore, the result of this subtraction is used in step 140 to check whether the predetermined time period was exceeded since the last synchronization.

In step 170, the system time is also read according to the second embodiment. The system time is calculated from the stored value of CPU counter 6 from tics memory 16, the stored value of FPGA register 4 from time memory 15, and a currently read value of CPU counter 6 in a unit time 17. To this end, a time period corresponding to the difference of the value of CPU counter 6 from tics memory 16 and the current value of CPU counter 6 is added to the value of time memory 15. This value represents the read system time.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for providing a timestamp in a real-time system, the real-time system comprising an FPGA and a CPU, which cooperate with one another, and at least one register in the FPGA, wherein the at least one register contains a system time, the method comprising:
    providing a CPU counter, the counter being driven by a clock signal generated by a clock generator of the CPU;
    providing a synchronization counter in the CPU, the synchronization counter being driven by the clock signal generated by the clock generator of the CPU;
    reading, by a real-time application in the CPU, the CPU counter to provide the system time to the real-time application;
    querying, by the real-time application, the synchronization counter to provide a counter value to the real-time application; and
    when the counter value output by the synchronization counter corresponds to less than a predetermined time period since the last synchronization of the CPU counter with the system time, providing a timestamp in the real-time system that is based on the CPU counter, and when the counter value output by the synchronization counter corresponds to more than a predetermined time period since the last synchronization of the CPU counter with the system time, synchronizing the CPU counter with the system time and providing a timestamp in the real-time system that is based on the CPU counter,
    wherein, interrupts are disabled during processing of the real-time application.

2. The method according to claim 1, wherein the synchronizing of the CPU counter with the system time comprises storing the CPU counter and the FPGA register value at the time of the synchronization, and wherein the step of providing of the system time to a real-time application comprises the calculating of the system time from the stored CPU counter, the stored FPGA register value, and the read value of the CPU counter.

3. The method according to claim 2, wherein the storing of the CPU counter at the time of synchronization comprises the following steps:
    reading the CPU counter before the storing of the FPGA register value;
    reading the CPU counter after the storing of the FPGA register value; and
    storing a time average of the CPU counter before and after the storing of the FPGA register value.

4. The method according to claim 1, wherein a step of reading the CPU counter by the real-time application is performed together with the steps of querying the synchronization counter in the real-time application and of synchronizing the CPU counter with the system time in the real-time application.

5. The method according to claim 1, wherein the steps of querying the synchronization counter in the real-time application and synchronizing the CPU counter with the system time in the real-time application are performed before a reading of the CPU counter by the real-time application.

6. The method according to claim 1, further comprising the step of periodic synchronization of the CPU counter with the system time.

7. The method according to claim 6, wherein the periodic synchronization of the CPU counter with the system time is carried out as part of a periodic real-time application or real-time task.

8. The method according to claim 7, wherein the periodic real-time application selected as the periodic real-time application or real-time task to carry out synchronization is one with the longest period length from all periodic real-time applications or real-time tasks.

9. The method according to claim 1, wherein the synchronization of the CPU counter with the system time is carried out as a low-priority application.

10. The method according to claim 1, wherein the real-time system carries out a planning for the time sequence of real-time applications and/or real-time tasks, and wherein the synchronization of the CPU counter with the system time is carried out in a time window which is not occupied by any real-time application or real-time task.

11. The method according to claim 1, wherein the real-time system has a plurality of CPUs, wherein in each CPU a CPU counter for the system time and a synchronization counter are provided, and wherein the synchronization of the CPU counter with the system time is carried out in a real-time application independently in each CPU.

12. A data processing unit as a real-time system having an FPGA and a CPU, which cooperate with one another, wherein at least one register, which contains a system time, is implemented in the FPGA, and wherein the real-time system is configured to carry out the steps of:
 providing a CPU counter, the counter being driven by a clock signal generated by a clock generator of the CPU;
 providing a synchronization counter in the CPU, the synchronization counter being driven by the clock signal generated by the clock generator of the CPU;
 reading, by a real-time application in the CPU, the CPU counter to provide the system time to the real-time application;
 querying, by the real-time application, the synchronization counter to provide a counter value to the real-time application; and
 when the counter value output by the synchronization counter corresponds to less than a predetermined time period since the last synchronization of the CPU counter with the system time, providing a timestamp in the real-time system that is based on the CPU counter, and when the counter value output by the synchronization counter corresponds to more than a predetermined time period since the last synchronization of the CPU counter with the system time, synchronizing the CPU counter with the system time and providing a timestamp in the real-time system that is based on the CPU counter,
 wherein, interrupts are disabled during processing of the real-time application.

13. The data processing unit according to claim 12, wherein the real-time system has a plurality of CPUs.

14. A non-transitory computer program product with computer-implemented instructions, the product, which after loading and execution in a suitable data processing unit, performs the steps of:
 providing a system time in a memory register of an FPGA;
 providing a CPU counter, the counter being driven by a clock signal generated by a clock generator of a CPU;
 providing a synchronization counter in the CPU, the synchronization counter being driven by the clock signal generated by the clock generator of the CPU;
 reading, by a real-time application in the CPU, the CPU counter to provide the system time to the real-time application;
 querying, by the real-time application, the synchronization counter to provide a counter value to the real-time application; and
 when the counter value output by the synchronization counter corresponds to less than a predetermined time period since the last synchronization of the CPU counter with the system time, providing a timestamp in the real-time system that is based on the CPU counter, and when the counter value output by the synchronization counter corresponds to more than a predetermined time period since the last synchronization of the CPU counter with the system time, synchronizing the CPU counter with the system time and providing a timestamp in the real-time system that is based on the CPU counter,
 wherein, interrupts are disabled during processing of the real-time application.

15. A non-transitory digital storage medium having electronically readable control signals and which is configured to work together with a programmable computer system so that a method is carried out in the computer system, the method comprising:
 providing a system time in a memory register of an FPGA;
 providing a CPU counter, the counter being driven by a clock signal generated by a clock generator of a CPU;
 providing a synchronization counter in the CPU, the synchronization counter being driven by the clock signal generated by the clock generator of the CPU;
 reading, by a real-time application in the CPU, the CPU counter to provide the system time to the real-time application;
 querying, by the real-time application, the synchronization counter to provide a counter value to the real-time application; and
 when the counter value output by the synchronization counter corresponds to less than a predetermined time period since the last synchronization of the CPU counter with the system time, providing a timestamp in the real-time system that is based on the CPU counter, and when the counter value output by the synchronization counter corresponds to more than a predetermined time period since the last synchronization of the CPU counter with the system time, synchronizing the CPU counter with the system time and providing a timestamp in the real-time system that is based on the CPU counter,
 wherein, interrupts are disabled during processing of the real-time application.

16. The method according to claim 1, wherein a threshold value of the predetermined time period since the last synchronization of the CPU counter with the system time is determined based on a requirement for accuracy of the real-time program reading the CPU counter.

* * * * *